(12) United States Patent
Slavenburg et al.

(10) Patent No.: US 8,994,640 B2
(45) Date of Patent: Mar. 31, 2015

(54) LOW MOTION BLUR LIQUID CRYSTAL DISPLAY

(71) Applicant: NVIDIA Corporation, Santa Clara, CA (US)

(72) Inventors: Gerrit Ary Slavenburg, San Jose, CA (US); Tom J. Verbeure, Sunnyvale, CA (US); Robert Jan Schutten, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 191 days.

(21) Appl. No.: 13/828,355

(22) Filed: Mar. 14, 2013

(65) Prior Publication Data

US 2014/0266996 A1 Sep. 18, 2014

(51) Int. Cl.
| | |
|---|---|
| *G09G 3/36* | (2006.01) |
| *G06F 3/147* | (2006.01) |
| *G09G 3/34* | (2006.01) |
| *G09G 5/36* | (2006.01) |

(52) U.S. Cl.
CPC ....... *G09G 3/36* (2013.01); *G06F 3/147* (2013.01); *G09G 3/3406* (2013.01); *G09G 5/363* (2013.01); *G09G 3/3648* (2013.01); *G09G 2310/0237* (2013.01); *G09G 2320/0252* (2013.01); *G09G 2320/0261* (2013.01); *G09G 2320/0646* (2013.01); *G09G 2340/16* (2013.01)
USPC .......................................................... 345/102

(58) Field of Classification Search
USPC .......... 345/87–89, 94, 99, 102, 204, 589, 690
See application file for complete search history.

(56) References Cited

U.S. PATENT DOCUMENTS

| | | | | |
|---|---|---|---|---|
| 8,578,192 B2 * | 11/2013 | Vasquez et al. | ............... | 713/320 |
| 8,711,167 B2 * | 4/2014 | Wyatt | ............... | 345/589 |
| 8,836,634 B2 * | 9/2014 | Lee | ............... | 345/102 |
| 2011/0157332 A1 * | 6/2011 | Kim et al. | ............... | 348/56 |

\* cited by examiner

*Primary Examiner* — Rodney Amadiz
(74) *Attorney, Agent, or Firm* — Artegis Law Group, LLP (57) ABSTRACT

One embodiment of the present invention sets forth a technique for reducing motion blur in a liquid crystal display (LCD) by pulsing each frame with a relatively short pulse of backlight illumination while driving pixels within the LCD with compensated intensity values to account for LCD settling time and vertical position. An LCD drive compensation unit implements the disclosed technique to generate an intensity value for each pixel that is scanned into the LCD. The technique advantageously reduces motion blur while preserving uniform vertical display accuracy.

20 Claims, 8 Drawing Sheets

LOW MOTION BLUR LIQUID CRYSTAL DISPLAY

BACKGROUND OF THE INVENTION

1. Field of the Invention

The present invention generally relates to liquid crystal display systems and, more specifically, to a low motion blur liquid crystal display.

2. Description of the Related Art

A liquid crystal display (LCD) system comprises a two-dimensional array of pixels, where each pixel comprises various color elements, such as red, green, and blue color elements. In an active matrix LCD panel, each color element includes a liquid crystal cell and an active drive circuit. The active drive circuit receives a row select signal and a column drive signal. When the row select signal is active, the column drive signal is coupled to the liquid crystal cell to establish an intensity value corresponding to an analog voltage for the column drive signal. An intensity value for each pixel within a row of pixels may be set simultaneously when an associated row select signal is set active. During normal operation of an LCD panel, a frame of video information is displayed on the two-dimensional array of pixels by selecting sequential rows and establishing intensity values for pixels in each row. A backlight typically supplies illumination for the LCD panel.

In a typical LCD panel, each intensity value is established relatively quickly for a given pixel. Furthermore, each intensity value remains constant until a new intensity value is established for the pixel. As a consequence, a moving object being portrayed in sequential frames on an LCD panel remains stationary and fully illuminated for the duration of each frame, leading to a perception of motion blur. Motion blur in this type of setting diminishes image quality by making moving objects appear blurry and smudged.

Accordingly, what is needed in the art is a technique for improved motion clarity in liquid crystal displays.

SUMMARY OF THE INVENTION

One embodiment of the present invention sets forth a method for generating compensated pixel data for a liquid crystal display (LCD). The method includes receiving new pixel data associated with a new frame of data, retrieving previous pixel data from a previous frame of data based on a pixel location for the new pixel data, computing compensated pixel data based on the new pixel data, the previous pixel data, and a line number associate with the pixel location, and transmitting the compensated pixel data to the LCD during a transmission interval. Further, the transmission interval is substantially non-overlapping with an illumination interval during which a backlight pulse is generated for a backlight associated with the LCD.

One advantage of the disclosed technique is that motion blur associated with LCD panels may be reduced while preserving vertically uniform display accuracy.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
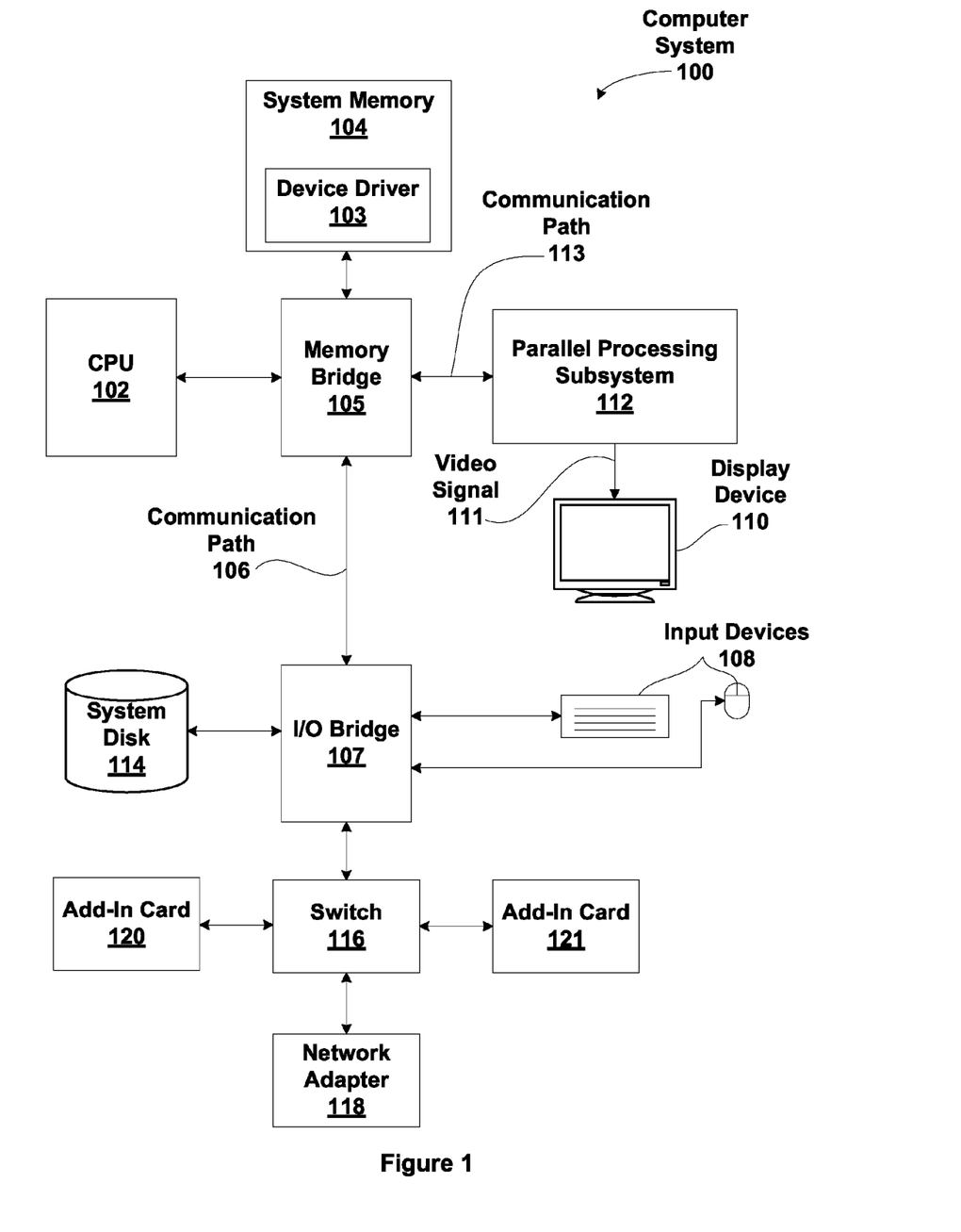
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via communication path 106 and memory bridge 105. A parallel processing subsystem 112 is coupled to memory bridge 105 via a bus or second communication path 113 (e.g., a Peripheral Component Interconnect (PCI) Express, Accelerated Graphics Port, or HyperTransport link).

In one embodiment, parallel processing subsystem 112 is a graphics subsystem that delivers pixels via video signal 111 to a display device 110, which is implemented using a liquid crystal display (LCD). A system disk 114 is also connected to I/O bridge 107. A switch 116 provides connections between I/O bridge 107 and other components such as a network adapter 118 and various add-in cards 120 and 121. Other components (not explicitly shown), including universal serial bus (USB) or other port connections, compact disc (CD) drives, digital video disc (DVD) drives, film recording devices, and the like, may also be connected to I/O bridge 107. The various communication paths shown in FIG. 1, including the specifically named communication paths 106 and 113 may be implemented using any suitable protocols, such as PCI Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements in a single subsystem, such as joining the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip instead of existing as one or more discrete devices. Large embodiments may include two or more CPUs 102 and two or more parallel processing subsystems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
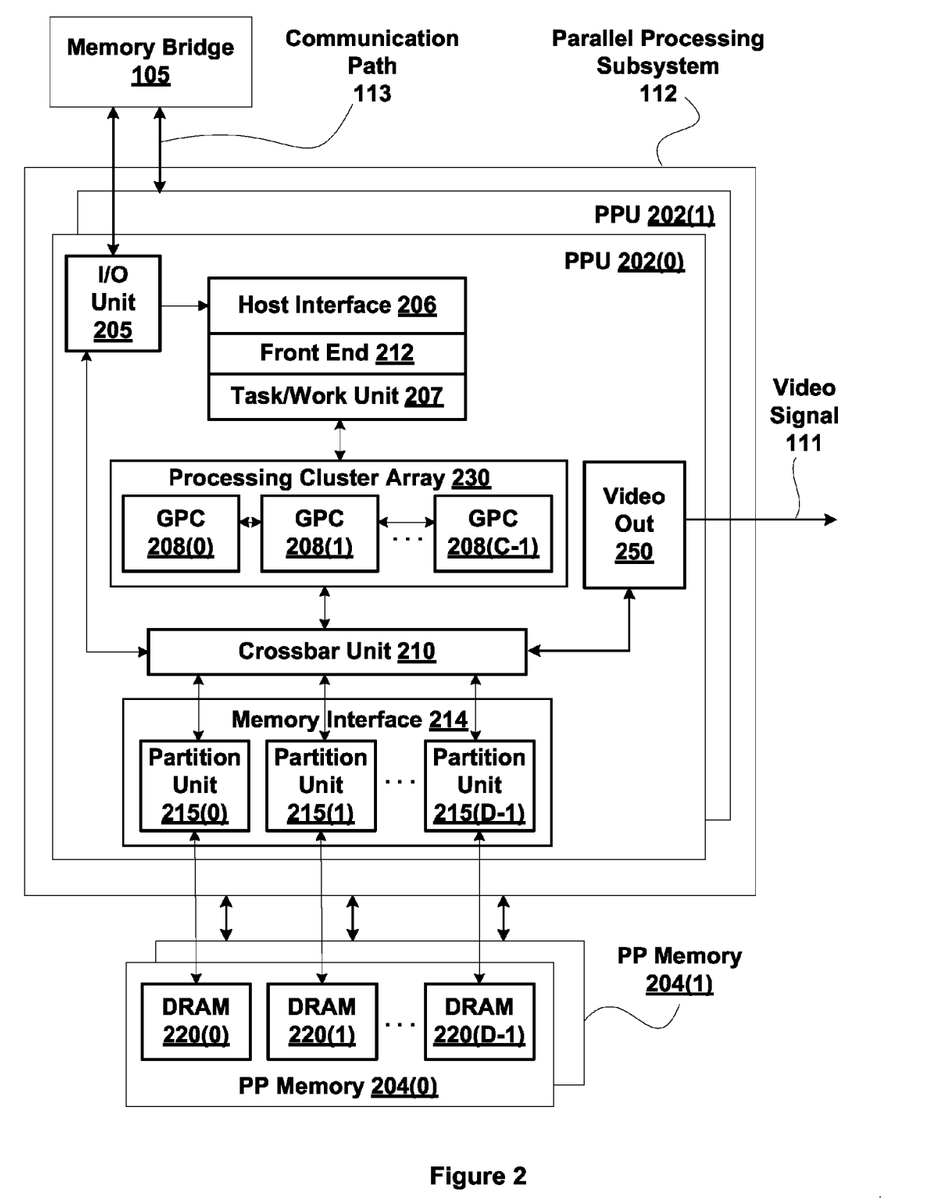
FIG. 2 is a block diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where U≥1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1 as well as FIG. 2, in some embodiments, some or all of PPUs 202 in parallel processing subsystem 112 are graphics processors with rendering pipelines that can be configured to perform various operations related to generating pixel data from graphics data supplied by CPU 102 and/or system memory 104 via memory bridge 105 and the second communication path 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have a dedicated parallel processing memory device(s) or no dedicated parallel processing memory device(s). One or more PPUs 202 in parallel processing subsystem 112 may output data to display device 110 or each PPU 202 in parallel processing subsystem 112 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a data structure (not explicitly shown in either FIG. 1 or FIG. 2) that may be located in system memory 104, parallel processing memory 204, or another storage location accessible to both CPU 102 and PPU 202. A pointer to each data structure is written to a pushbuffer to initiate processing of the stream of commands in the data structure. The PPU 202 reads command streams from one or more pushbuffers and then executes commands asynchronously relative to the operation of CPU 102. Execution priorities may be specified for each pushbuffer by an application program via the device driver 103 to control scheduling of the different pushbuffers.

Each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI Express link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the command stream stored in the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary dependent on the workload arising for each type of program or computation.

GPCs 208 receive processing tasks to be executed from a work distribution unit within a task/work unit 207. The work distribution unit receives pointers to processing tasks that are encoded as task metadata (TMD) and stored in memory. The pointers to TMDs are included in the command stream that is stored as a pushbuffer and received by the front end unit 212 from the host interface 206. Processing tasks that may be encoded as TMDs include indices of data to be processed, as well as state parameters and commands defining how the data is to be processed (e.g., what program is to be executed). The task/work unit 207 receives tasks from the front end 212 and ensures that GPCs 208 are configured to a valid state before the processing specified by each one of the TMDs is initiated. A priority may be specified for each TMD that is used to schedule execution of the processing task. Processing tasks can also be received from the processing cluster array 230. Optionally, the TMD can include a parameter that controls whether the TMD is added to the head or the tail for a list of processing tasks (or list of pointers to the processing tasks), thereby providing another level of control over priority.

Memory interface 214 includes a number D of partition units 215 that are each directly coupled to a portion of parallel processing memory 204, where D≥1. As shown, the number of partition units 215 generally equals the number of dynamic random access memory (DRAM) 220. In other embodiments, the number of partition units 215 may not equal the number of memory devices. Persons of ordinary skill in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. In the embodiment shown in FIG. 2, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI Express) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

In one embodiment, a video out unit 250 is configured to read image data residing within PP memory 204, such as via crossbar unit 210, and to generate a video signal 111 based on the image data. Video signal 111 may implement any technically feasible digital or analog signaling protocol, such as the well-known high-definition multimedia interface (HDMI) or digital visual interface (DVI) video signal standards.

Low Motion Blur Liquid Crystal Display

Figure 3A:
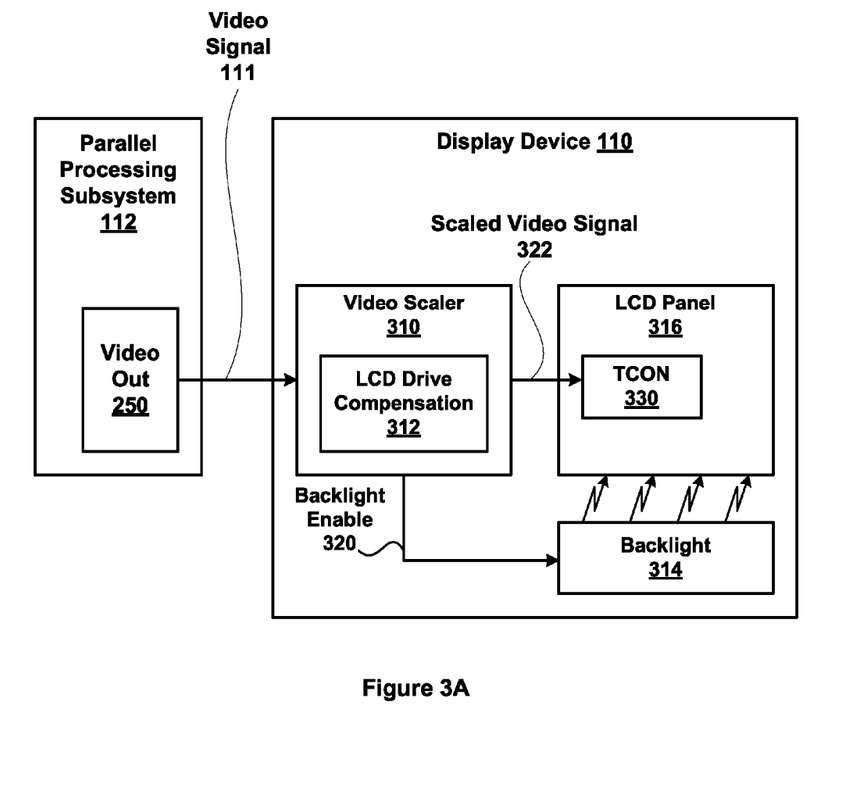
FIG. 3A is a block diagram of a display device, configured to implement one or more aspects of the present invention.

FIG. 3A is a block diagram of display device 110, configured to implement one or more aspects of the present invention. As shown, display device 110 comprises a video scaler 310, a backlight 314, and an LCD panel 316. Backlight 314 is configured to provide illumination for LCD panel 316. Backlight enable signal 320 controls whether backlight 314 is turned on or off. LCD panel 316 includes an array of LCD pixels, timing control circuitry, and driver circuits to establish intensity values for pixels within the array of LCD pixels.

Video signal 111 specifies video frame information having a certain source spatial resolution, while a scaled video signal 322 is generated to be consistent with a spatial resolution associated with LCD panel 316. Video scaler 310 is configured to receive video signal 111 and generate scaled video signal 322, comprising a scaled rendering of video signal 111. Scaled video signal 322 is transmitted to internal control circuitry, such as a timing control (TCON) circuit 330, within LCD panel 316. TCON circuit 330 receives scaled video signal 322, which matches the spatial resolution associated with LCD panel 316, and generates internal timing and control signals. For example, TCON circuit 330 may generate specifically timed control signals to enable individual row driver circuits and to select column data for column drivers.

In one embodiment, video scaler 310 includes an LCD drive compensation unit 312, configured to implement pixel drive emphasis or "over-drive" to hasten intensity transitions to a desired intensity level. In alternative embodiments, LCD drive compensation unit 312 resides instead within an interposer circuit (not shown) along the path of scaled video signal 322 between video scaler 310 and TCON 330. LCD drive compensation unit 312 is described in greater detail below in FIGS. 4A through 7. Video scaler 310 generates vertical blanking interval information for scaled video signal 322. In one embodiment, video scaler 310 generates backlight enable signal 320 to enable backlight 314 during a vertical blanking interval associated with scaled video signal 322, as illustrated below in FIG. 4B. In an alternative embodiment, TCON 330 may be configured to generate backlight enable signal 320 to enable backlight 314 during the vertical blanking interval, as illustrated below in FIG. 4B.

Figure 3B:
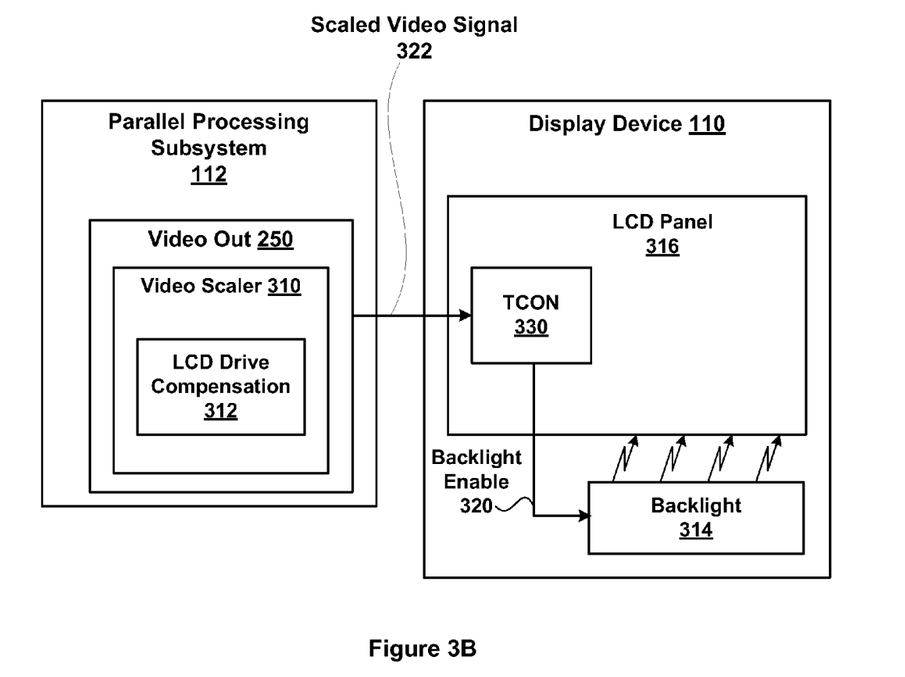
FIG. 3B is a block diagram of a parallel processing subsystem, configured to implement one or more aspects of the present invention.

FIG. 3B is a block diagram of parallel processing subsystem 112, configured to implement one or more aspects of the present invention. This block diagram may represent an efficient implementation of embodiments of the present invention for devices such as laptop computers and tablet computers with a built-in display device 110. As shown, video out unit 250 is configured to include video scaler 310, which generates scaled video signal 322. Video scaler 310 includes LCD drive compensation unit 312. In certain embodiments, TCON circuit 330 is configured to generate backlight enable signal 320 based on vertical blacking interval timing information within scaled video signal 322. In certain other embodiments, parallel processing subsystem 112 generates backlight enable signal 320 to enable backlight 314 during the vertical blanking interval, as illustrated below in FIG. 4B. In an alternative embodiment, LCD drive compensation unit 312 resides instead within an interposer circuit (not shown) along the path of scaled video signal 322. In another alternative embodiment, LCD drive compensation unit 312 resides instead within TCON 330.

In general, video scaler 310 may reside within parallel processing subsystem 112, display device 110, TCON 330, or one or more combinations thereof. Furthermore, LCD drive compensation unit 312 is configured to receive scaled video signal 322 from video scaler 310 and to generate a corresponding stream of compensated pixel data. Backlight enable signal 320 may be generated by parallel processing subsystem 112, video scaler 310, TCON 330, or any technically feasible subsystem with access to video timing.

Video scaler 310 is configured to perform video blanking interval up-conversion, whereby a frame comprising source pixel data is received and stored at one pixel data rate by video scaler 310, but transmitted at a higher pixel data rate by video scaler 310 while maintaining a constant frame rate. In this way, a vertical blanking interval may be extended at the cost of an increased pixel data rate.

Figure 4A:
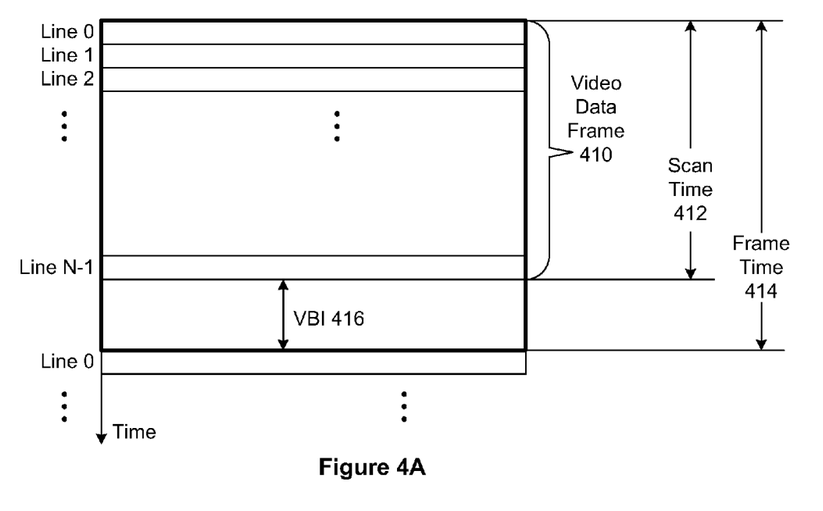
FIG. 4A illustrates a video data frame being scanned into a liquid crystal display (LCD) with respect to time, according to one embodiment of the present invention.

FIG. 4A illustrates a video data frame 410 being scanned into an LCD, such as LCD panel 316 of FIG. 3A, with respect to time, according to one embodiment of the present invention. The video data frame 410 comprises a set of N lines of pixel data, with line 0 (zero) scanned into the LCD first and line N-1 scanned into the LCD last. After line N-1 is scanned into the LCD, a vertical blanking interval (VBI) 416 elapses before a new video data frame is scanned into the LCD, beginning again with line 0.

A scan time 412 includes the time needed to scan lines 0 through N-1. A frame time 414 includes scan time 412 as well as VBI 416. In a practical system with a 60 Hz refresh rate, frame time 414 is approximately 16.66 milliseconds. Similarly, in a system with a 120 Hz refresh rate, frame time 414 is approximately 8.33 milliseconds. Scan time 412 and VBI 416 may be traded off to yield a desired frame time 414.

Figure 4B:
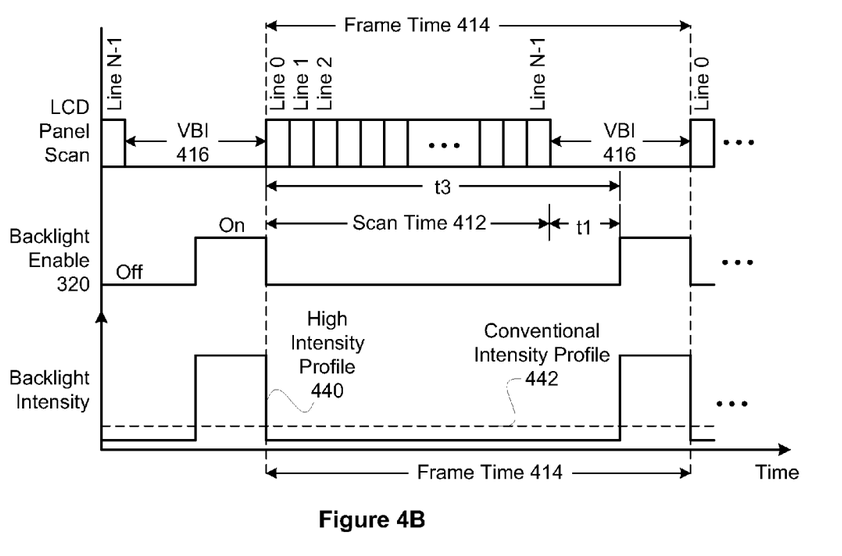
FIG. 4B illustrates backlight timing with respect to a vertical blanking interval, according to one embodiment of the present invention.

FIG. 4B illustrates backlight timing with respect to a vertical blanking interval, according to one embodiment of the present invention. As shown, scanning LCD panel 316 starts with line 0 and proceeds to line N-1 during scan time 412, followed by VBI 416. When a given line is scanned into the LCD panel, pixel data for the line is stored within capacitive elements associated with LCD cells comprising the LCD panel. Each pixel within the line receives an intensity value for each component color. In one embodiment, column drivers within the LCD panel transmit an intensity value for each color component comprising a pixel residing within a given line. Each intensity value is transmitted via a voltage driven along a corresponding column wire. Each pixel color is determined by a ratio of component intensity values associated with the pixel. A pixel may include any technically feasible set of color components such as red, green, and blue color components needed to depict a useful range of colors. When a pixel is driven to a set of new color component intensity values, a settling time is required before each color component is able to fully transition from a previous intensity value to a new intensity value. In conventional LCD systems this transition time can range from less than one millisecond to ten or more milliseconds.

As shown, a conventional intensity profile 442 is characterized as having constant average intensity throughout each frame time 414. Conventional intensity profile 442 may be pulse-width modulated at a frequency that is at least an order of magnitude higher than a prevailing frame rate to achieve the constant average intensity. By contrast, embodiments of the present invention instead illuminate backlight 314 of FIG. 3A during VBI 416, according to high intensity profile 440. Backlight enable signal 320 is asserted "on" during a portion of VBI 416, causing backlight 314 to emit a relatively brief pulse of light according to a high intensity profile 440. The brief pulse of light illuminates the array of LCD pixels within LCD panel 316. By illuminating the LCD panel with a brief pulse of light rather than with constant illumination, motion blur may be significantly reduced.

In one embodiment, backlight enable signal 320 is asserted "off" coincident with or shortly after the beginning of scan time 412. Here, time t3 indicates how much settling time a pixel in line 0 has prior to the backlight being enabled, while t1 indicates how much settling time a pixel in line N-1 has prior to the backlight being enabled. Settling time is described in greater detail below in FIG. 5. In certain implementations, backlight 314 is enabled for a duration of 1 to 3 milliseconds. In a system operating at a refresh rate of 120 Hz, frame time 414 is 8.33 milliseconds. As such, t3 will be less than 8 milliseconds in duration, and t1 will likely be less than one millisecond in duration. Given a conventional settling time of one to ten milliseconds, pixels residing in line 0 will have substantially sufficient conventional settling time for certain intensity transitions, while pixels residing in line N-1 will not have adequate conventional settling time for most intensity transitions.

Figure 5:
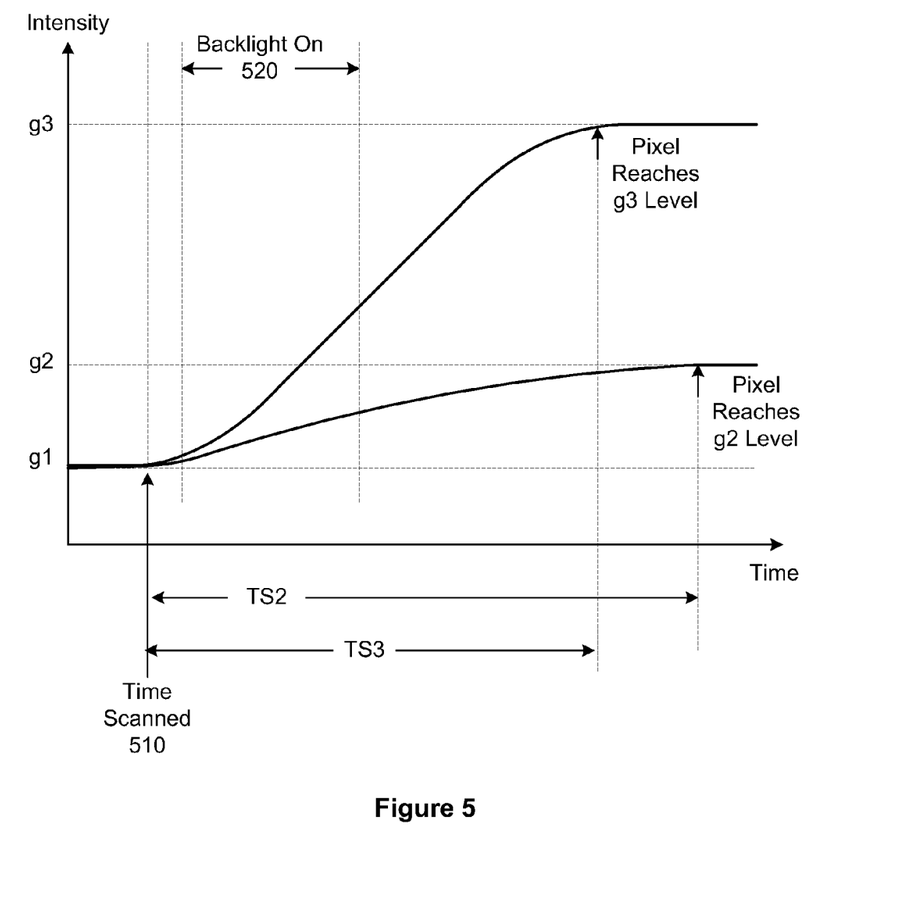
FIG. 5 illustrates LCD settling time for two different transitions, according to one embodiment of the present invention.

FIG. 5 illustrates LCD settling time for two different transitions, according to one embodiment of the present invention. An LCD element within an LCD device makes a first transition from gray intensity level g1 to gray intensity level g2 in settling time TS2. Here, the difference between gray intensity level g2 and gray intensity level g1 determines the initial rate of transition. A gray intensity level refers to an overall intensity level independent of color component composition and may refer to an intensity associated with a single color component or an intensity associated with pixel comprising two or more color components. A second, different transition from g1 to g3 requires settling time TS3 and has an initial rate of transition that is faster than the initial rate of transition for the first transition. In a practical system, settling times range from less than one millisecond to approximately ten milliseconds.

A given duration of backlight illumination associated with high intensity profile 440 in the context of LCD settling time is illustrated approximately to scale by a backlight in on time interval 520. Perceived intensity for a single frame for a pixel following a given transition is approximately an average of intensity during backlight on time interval 520. While perceived intensity may stabilize during a subsequent frame, a perception of motion blur may occur when the perceived intensity transitions over multiple frames. Furthermore, perceived intensity may vary as a function of line number, backlight pulse width, and backlight pulse position with respect to frame time 414. Intensity variation as well as motion blur may be overcome using LCD drive compensation or "over-drive" techniques illustrated below in FIG. 6.

Figure 6:
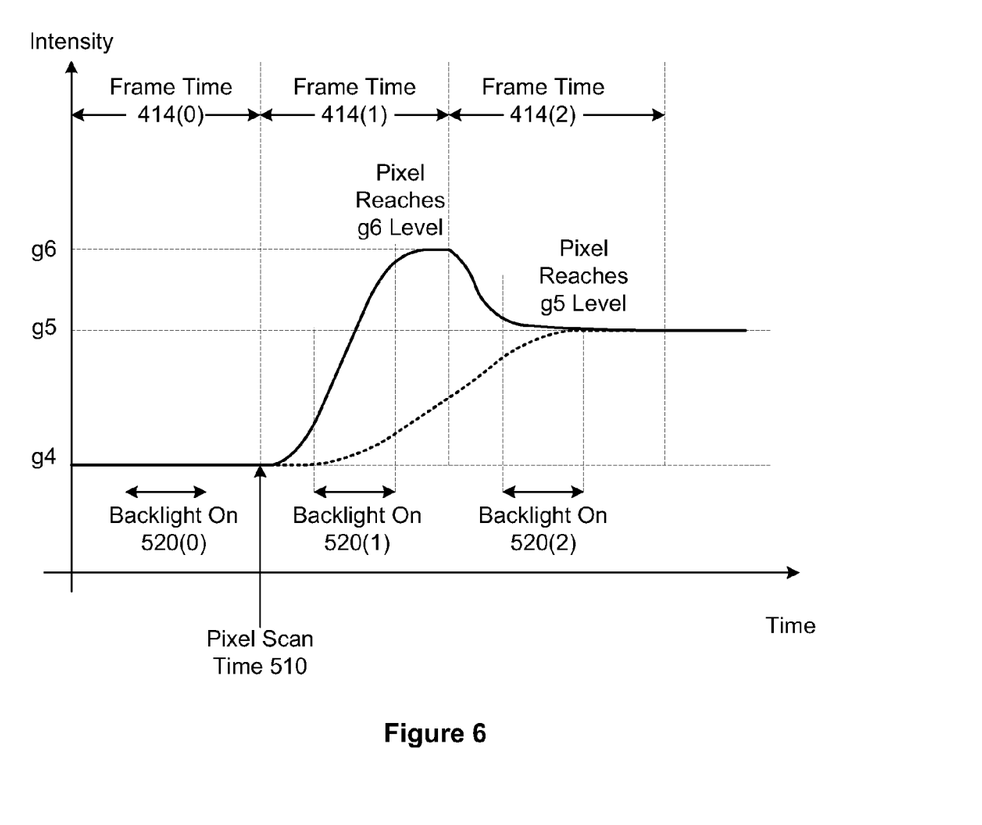
FIG. 6 illustrates LCD overdrive, according to one embodiment of the present invention.

FIG. 6 illustrates LCD overdrive, according to one embodiment of the present invention. Gray intensity curves for the same pixel are illustrated over three sequential frame times 414. An initial gray intensity level of g4 is assumed and a transition to g5 is specified in image information comprising the pixel. An uncompensated gray intensity level transition from g4 to g5 is illustrated as the dashed curve. Here, the average intensity for frame time 414(1) during backlight on interval 520(1) is well below g5. As a consequence, perceived intensity for the pixel will be too dark during frame time 414(1). However, when the same pixel is driven using a drive compensated (over-drive) curve illustrated as a solid curve, an appropriate average intensity of approximately g5 may be achieved during frame time 414(1) as well as during frame 414(2). While individual pixel intensity during individual frames may not be easily perceived in isolation, overall frame quality is degraded by motion blur and transient non-uniformity when average intensity levels are inaccurately reproduced. As such, embodiments of the present invention enable LCD drive compensation unit 312 to compensate for inter-frame differences in individual pixel intensity levels to yield faster and more accurate intensity level transitions. Furthermore, LCD drive compensation unit 312 also compensates for non-uniformity arising from line number and backlight pulse width. Certain embodiments also compensate for backlight pulse position with respect to frame time 414.

A given LCD panel 316 may have a unique set of settling parameters and may need to be characterized for those parameters. Detailed characterization and modeling for a specific LCD panel is beyond the scope of the present invention. However, embodiments of the present invention implement characterization parameters and appropriate transition models within LCD drive compensation unit 312 to compensate for each possible combination of input parameters. These input parameters include a current specified intensity value for a pixel, at least one previous intensity value for the same pixel, and a line number for the pixel. The input parameters may also include a pulse width, and may additionally include a pulse time. Therefore, each pixel within LCD panel 316 is driven with a function of the form given below in Equation 1:

$$\text{pixel\_drive\_value} = F(\text{pix\_}t0, \text{pix\_}t-1, \{\text{pix\_}t-2, \ldots\}, \text{pix\_line}) \qquad (\text{Eq. 1})$$

Here, pixel_line indicates a line number (vertical position) for a current pixel residing within a current frame, pix_t0 is a current pixel intensity value specified for the current pixel in the current frame, pixe_t−1 is a pixel intensity value specified for the current pixel in a frame immediately prior to the current frame, and pixel_drive_value is a pixel intensity value used to scan the current pixel for the current frame into LCD panel 316. In certain embodiments, one or more additional pixel intensity values from sequentially previous frames may also be used to compute pixel_drive_value. Equation 1 may be implemented using any technically feasible technique, such as one or more lookup tables, a set of mathematical equations, a set of mathematical equations in combination with one or more lookup tables, and the like.

In a practical implementation, Equation 1 may be used to compute a value for g6 to be scanned into LCD panel 316 during frame time 414(1) for a corresponding pixel. In this example, Equation 1 generates the value of g6 based on a pixel line number, a specified target intensity of g5 for the pixel, and a previous intensity of g4 for the pixel. In frame time 414(2), Equation 1 generates a value of g5 for the pixel.

In one embodiment, LCD drive compensation unit 312 stores at least one frame of pix_t0 values to act as pix_t−1 values in a subsequent frame. In an alternative embodiment, LCD drive compensation unit 312 stores at least one frame of pixel_drive_value values to act as pix_t−1 values in a subsequent frame. In still other embodiments, any technically feasible pixel intensity value is stored to act as pix_t−1 values in a subsequent frame. For implementations requiring an intensity history of two or more sequential samples, a corresponding frame is stored for each sequential sample needed. New pixel data may be stored in place into the oldest frame as pixel data from the oldest frame is used. For example, in an implementation requiring pix_t−1 data and pix_t−2 data, buffers for two different frames should be allocated. As new pixel is received for display, corresponding pixel data in the pix_t−2 buffer may be retrieved to compute a corresponding pixel_drive_value. Furthermore, the new pixel data may be stored in place in the pix_t−2 buffer. At the end of each frame, the buffers are swapped, so that pix_t−1 data is now pix_t−2 data. The second buffer, having been overwritten with new pixel data now stores pix_t−1 data for an upcoming frame.

Figure 7:
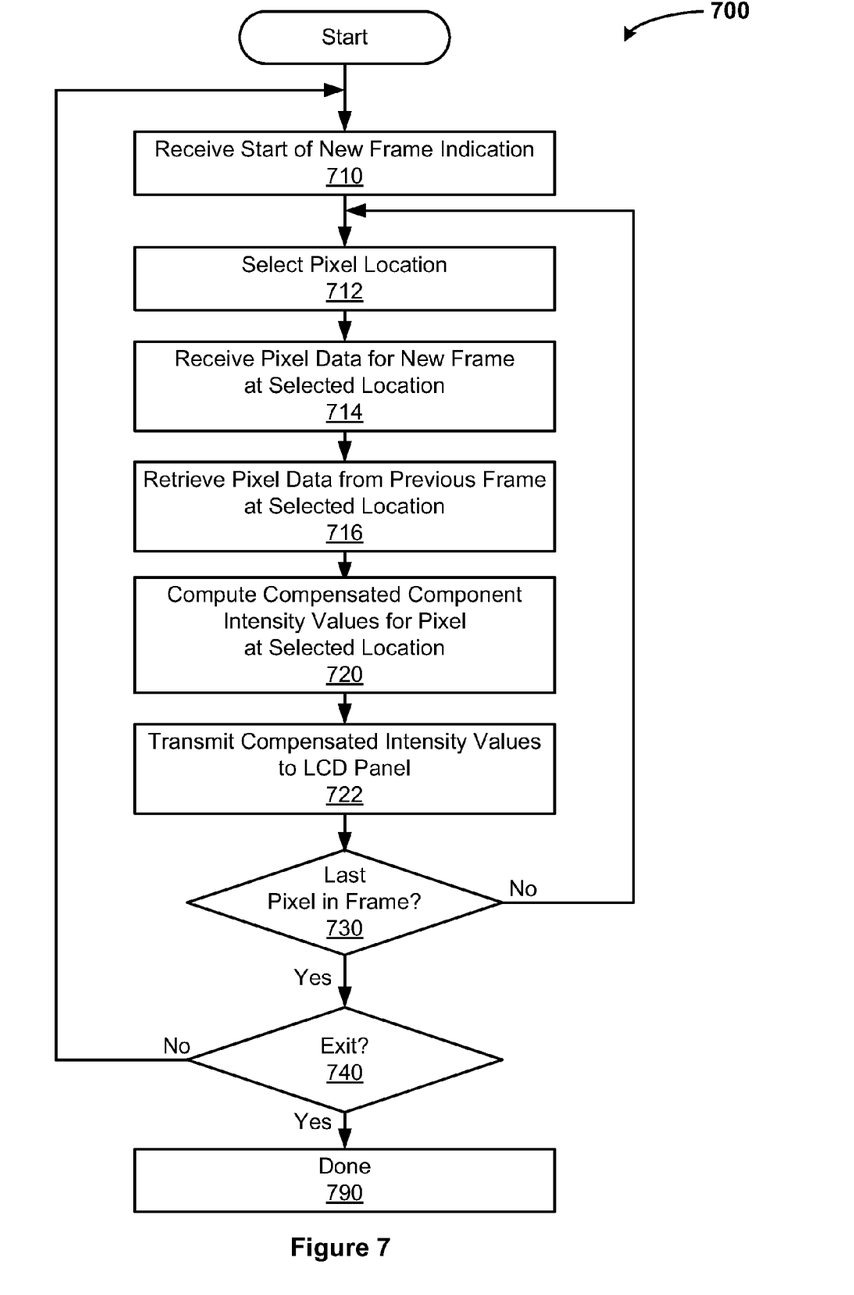
FIG. 7 is a flow diagram of method steps, performed by an LCD drive compensation unit, for driving an LCD based on over-drive compensation, according to one embodiment of the present invention.

FIG. 7 is a flow diagram of method steps, performed by an LCD drive compensation unit, such as LCD drive compensation unit 312 of FIG. 3A, for driving an LCD device based on over-drive compensation, according to one embodiment of the present invention. Although the method steps are described in conjunction with the systems of FIGS. 1-3B, persons of ordinary skill in the art will understand that any system configured to perform the method steps, in any order, is within the scope of the inventions.

As shown, a method 700 begins in step 710, where the LCD drive compensation unit receives a signal indicating the start of a new frame. In one embodiment, the signal comprises a new frame timing signal used to indicate the start of a new frame and further indicating that a pixel data stream is beginning at an initial line and an initial pixel within the line. In step 712, the LCD drive compensation unit selects a pixel location, based on a rasterization pattern for the new frame. For example, in a new frame comprising N lines and P pixels per line, the rasterization pattern may sequentially select line 0, an initial line, through line N−1. In each line, the rasterization pattern may sequentially select pixel 0, an initial pixel, through pixel P−1. In step 714, the LCD drive compensation unit receives pixel data for the new frame at the selected pixel location. The pixel data may comprise one or more gray intensity levels, such as red, green, and blue intensity levels, corresponding to color components. In step 716, the LCD drive compensation unit retrieves previous pixel data from a previous frame at the selected pixel location.

In step 720, the LCD drive compensation unit computes one or more compensated component intensity values for a pixel at the selected pixel location, based on at least the pixel data and the previous pixel data according to Equation 1. In certain embodiments, prior pixel data from two or more previous frames may be used according to Equation 1. In step 722, the LCD drive compensation unit transmits the one or more compensated component intensity values to an LCD panel for display. In one embodiment, the LCD drive compensation unit also stores current pixel data into a buffer to serve as prior pixel data when processing a subsequent frame. If, in step 730, the selected pixel location represents the last pixel in the new frame, then the method proceeds to step 740, otherwise the method proceeds back to step 712.

In step 740, if the method should exit, then the method terminates in step 790, otherwise the method proceeds back to step 710. The method may terminate for various reasons, including powering down the LCD drive compensation unit.

In sum, a technique is disclosed for reducing motion blur in an LCD device by pulsing each frame with a relatively short pulse of backlight illumination while driving pixels within the LCD device with compensated intensity values to account for LCD settling time. The technique computes a compensated intensity value for each pixel based on a current component intensity value, a component intensity value from a previous frame, and a line number associated with the pixel. The technique may further compute the compensated intensity value based on a backlight pulse width, pulse placement, or both. An LCD drive compensation unit implements the disclosed technique to generate an intensity value for each pixel that is scanned into the LCD device.

One advantage of the techniques described herein is that motion blur associated with LCD panels may be reduced while preserving vertically uniform display accuracy.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as compact disc read only memory (CD-ROM) disks readable by a CD-ROM drive, flash memory, read only memory (ROM) chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

In view of the foregoing, the scope of embodiments of the present invention is defined by the claims that follow.

The invention claimed is:

1. A method for generating pixel data for a liquid crystal display (LCD), the method comprising:
   receiving new pixel data associated with a new frame of data;
   retrieving previous pixel data from a previous frame of data based on a pixel location for the new pixel data;
   computing compensated pixel data based on the new pixel data, the previous pixel data, and a line number associate with the pixel location; and
   transmitting the compensated pixel data to the LCD during a transmission interval, wherein the transmission interval is substantially non-overlapping with an illumination interval during which a backlight illumination pulse is generated for a backlight associated with the LCD.

2. The method of claim 1, wherein computing compensated pixel data is further based on a duration value for the backlight illumination pulse.

3. The method of claim 2, wherein the compensated pixel data comprises an intensity value that produces an average pixel intensity corresponding to the new pixel data when scanned into the LCD at the line number and illuminated by the backlight illumination pulse.

4. The method of claim 2, further comprising generating the backlight illumination pulse substantially during a vertical blanking interval.

5. The method of claim 2, further comprising varying the duration value for the backlight illumination pulse to adjust a screen intensity associated with the LCD.

6. The method of claim 1, wherein the compensated pixel data comprises an over-driven intensity value relative to a corresponding intensity value associated with the new pixel data.

7. The method of claim 1, wherein an LCD drive compensation unit residing within a processing subsystem is configured to compute the compensated pixel data.

8. The method of claim 1, further comprising performing video blanking interval up-conversion on source pixel data to generate the new pixel data.

9. A subsystem configured to generate pixel data for a liquid crystal display (LCD), the subsystem comprising:
   a memory system configured to store at least a frame of data; and
   a video scaler unit configured to generate compensated pixel values by:
      receiving new pixel data associated with a new frame of data;
      retrieving previous pixel data from a previous frame of data based on a pixel location for the new pixel data;
      computing compensated pixel data based on the new pixel data, the previous pixel data, and a line number associate with the pixel location; and
      transmitting the compensated pixel data to the LCD during a transmission interval, wherein the transmission interval is substantially non-overlapping with an illumination interval during which a backlight illumination pulse is generated for a backlight associated with the LCD.

10. The subsystem of claim 9, wherein computing the compensated pixel data is further based on a duration value for the backlight illumination pulse.

11. The subsystem of claim 10, wherein the compensated pixel data comprises an intensity value that produces an average pixel intensity corresponding to the new pixel data when scanned into the LCD at the line number and illuminated by the backlight illumination pulse.

12. The subsystem of claim 10, wherein the backlight illumination pulse is generated substantially during a vertical blanking interval.

13. The subsystem of claim 10, wherein the duration value is varied to adjust a screen intensity associated with the LCD.

14. The subsystem of claim 9, wherein the compensated pixel data comprises an over-driven intensity value relative to a corresponding intensity value associated with the new pixel data.

15. The subsystem of claim 9, wherein the video scalar unit is further configured to perform video blanking interval up-conversion on source pixel data to generate the new pixel data.

16. A computing device, comprising:
   a liquid crystal display (LCD); and
   a memory system configured to store at least a frame of data, and
   a video scaler unit configured to generate compensated pixel values by:
      receiving new pixel data associated with a new frame of data;

retrieving previous pixel data from a previous frame of data based on a pixel location for the new pixel data;

computing compensated pixel data based on the new pixel data, the previous pixel data, and a line number associate with the pixel location; and transmitting the compensated pixel data to the LCD during a transmission interval, wherein the transmission interval is substantially non-overlapping with an illumination interval during which a backlight pulse is generated for a backlight associated with the LCD.

17. The computing device of claim 16, further comprising a processing subsystem that includes the video scaler unit.

18. The computing device of claim 16, further comprising a display unit that includes the video scaler unit and the LCD, and wherein the video scaler unit is configured to perform video blanking interval up-conversion on source pixel data to generate the new pixel data.

19. The computing device of claim 16, wherein computing the compensated pixel data is further based on a duration value for a backlight illumination pulse.

20. The computing device of claim 16, wherein the compensated pixel data comprises an over-driven intensity value relative to a corresponding intensity value associated with the new pixel data.

* * * * *